United States Patent [19]

Ueda

[11] Patent Number: 5,579,465
[45] Date of Patent: Nov. 26, 1996

[54] SHIFTED CHARACTER PATTERN DATA PROCESSOR

[75] Inventor: Shigeru Ueda, Wako, Japan

[73] Assignee: Canon Kabushiki Kaisha, Tokyo, Japan

[21] Appl. No.: 141,706

[22] Filed: Oct. 27, 1993

Related U.S. Application Data

[63] Continuation of Ser. No. 750,696, Aug. 20, 1991, abandoned, which is a continuation of Ser. No. 378,489, Jul. 12, 1989, abandoned, which is a continuation of Ser. No. 875,564, Jun. 18, 1986, abandoned.

[30] Foreign Application Priority Data

Jun. 27, 1985 [JP] Japan ................................. 60-138979

[51] Int. Cl.$^6$ .................. G06F 3/00; G06F 9/00
[52] U.S. Cl. ............... 395/788; 364/931.03; 364/943.43; 364/943.44; 364/DIG. 2
[58] Field of Search ................. 395/275, 144, 395/145, 110, 150, 151, 148

[56] References Cited

U.S. PATENT DOCUMENTS

| | | | |
|---|---|---|---|
| 3,916,388 | 10/1975 | Shimp | 340/172.5 |
| 3,997,771 | 12/1976 | Perlowski et al. | 235/156 |
| 4,122,534 | 10/1978 | Cesaratto | 364/900 |
| 4,149,263 | 4/1979 | Prioste | 364/900 |
| 4,300,206 | 11/1981 | Belleson et al. | 395/275 |
| 4,330,834 | 5/1982 | Murphy | 395/144 |
| 4,383,304 | 5/1983 | Hirashima | 364/900 |
| 4,400,791 | 8/1983 | Kitado | 364/900 |
| 4,410,990 | 10/1983 | Wilkson | 364/900 |
| 4,451,883 | 5/1984 | Stanley et al. | 364/200 |
| 4,527,252 | 7/1985 | Donohue et al. | 364/900 |
| 4,590,585 | 5/1986 | Cummings et al. | 395/275 |
| 4,604,723 | 8/1986 | Burrows | 364/786 |
| 4,615,010 | 9/1986 | Arazu et al. | 395/110 |
| 4,625,295 | 11/1986 | Skninner | 364/900 |
| 4,627,749 | 12/1986 | Meo et al. | 364/200 |
| 4,635,212 | 1/1987 | Hatazawa | 395/110 |
| 4,737,923 | 4/1988 | Matsuzaki et al. | 395/111 |
| 4,747,154 | 5/1988 | Suzuki et al. | 382/47 |
| 4,843,593 | 6/1989 | Yanaru et al. | 364/900 |

FOREIGN PATENT DOCUMENTS

WO79/01166 12/1979 WIPO.

*Primary Examiner*—Kevin J. Teska
*Assistant Examiner*—Ayni Mohamed
*Attorney, Agent, or Firm*—Fitzpatrick, Cella, Harper & Scinto

[57] ABSTRACT

A bit data processor includes bit data input device, an indicator for indicating a shift distance of the bit data inputted by the input device and modifying the indication data in accordance with an output position of the bit data, and a memory for receiving, as an address, the bit data supplied by the input device and the indication data supplied from the indicator to output a shifted bit data.

16 Claims, 6 Drawing Sheets

| 121 | 111 | | 112 ADDRESS | | | | | | | | | 120 OUTPUT DATA | | | | | | | |
|---|---|---|---|---|---|---|---|---|---|---|---|---|---|---|---|---|---|---|---|
| A11 | A10 | A9 | A8 | A7 | A6 | A5 | A4 | A3 | A2 | A1 | A0 | Ō0 | Ō1 | Ō2 | Ō3 | Ō4 | Ō5 | Ō6 | Ō7 |
| 0 | 0 | 0 | 0 | A7 | A6 | A5 | A4 | A3 | A2 | A1 | A0 | A0 | A1 | A2 | A3 | A4 | A5 | A6 | A7 |
| 0 | 0 | 0 | 1 | — | — | — | — | — | — | — | — | A1 | A2 | A3 | A4 | A5 | A6 | A7 | 0 |
| 0 | 0 | 1 | 0 | — | — | — | — | — | — | — | — | A2 | A3 | A4 | A5 | A6 | A7 | 0 | 0 |
| 0 | 0 | 1 | 1 | — | — | — | — | — | — | — | — | A3 | A4 | A5 | A6 | A7 | 0 | 0 | 0 |
| 0 | 1 | 0 | 0 | — | — | — | — | — | — | — | — | A4 | A5 | A6 | A7 | 0 | 0 | 0 | 0 |
| 0 | 1 | 0 | 1 | — | — | — | — | — | — | — | — | A5 | A6 | A7 | 0 | 0 | 0 | 0 | 0 |
| 0 | 1 | 1 | 0 | — | — | — | — | — | — | — | — | A6 | A7 | 0 | 0 | 0 | 0 | 0 | 0 |
| 0 | 1 | 1 | 1 | — | — | — | — | — | — | — | — | A7 | 0 | 0 | 0 | 0 | 0 | 0 | 0 |
| 1 | 0 | 0 | 0 | — | — | — | — | — | — | — | — | 0 | 0 | 0 | 0 | 0 | 0 | 0 | A0 |
| 1 | 0 | 0 | 1 | — | — | — | — | — | — | — | — | 0 | 0 | 0 | 0 | 0 | 0 | A0 | A1 |
| 1 | 0 | 1 | 0 | — | — | — | — | — | — | — | — | 0 | 0 | 0 | 0 | 0 | A0 | A1 | A2 |
| 1 | 0 | 1 | 1 | — | — | — | — | — | — | — | — | 0 | 0 | 0 | 0 | A0 | A1 | A2 | A3 |
| 1 | 1 | 0 | 0 | — | — | — | — | — | — | — | — | 0 | 0 | 0 | A0 | A1 | A2 | A3 | A4 |
| 1 | 1 | 0 | 1 | — | — | — | — | — | — | — | — | 0 | 0 | A0 | A1 | A2 | A3 | A4 | A5 |
| 1 | 1 | 1 | 0 | — | — | — | — | — | — | — | — | 0 | A0 | A1 | A2 | A3 | A4 | A5 | A6 |
| 1 | 1 | 1 | 1 | A7 | A6 | A5 | A4 | A3 | A2 | A1 | A0 | A0 | A1 | A2 | A3 | A4 | A5 | A6 | A7 |

SHIFTED CHARACTER PATTERN DATA PROCESSOR

This application is a continuation of application Ser. No. 07/750,696 filed Aug. 20, 1991, now abandoned, which is a continuation of application Ser. No. 07/378,489 filed Jul. 12, 1989, now abandoned, which is a continuation of application Ser. No. 06/875,564 filed Jun. 18, 1986, now abandoned.

BACKGROUND OF THE INVENTION

1. Field of the Invention

The present invention relates to a bit data processor, and more particularly to a bit data processor which shifts a bit data by a desired number of bits.

2. Related Background Art

In a printer which prints out text information in the form of a bit image, a character pattern data for character codes of the text information is developed as a bit image on an image memory before it is printed out. The image memory of such a printer is usually read and written 4–8 bits parallel in accordance with a bit width of a data bus of a CPU. The character pattern data is of variety of forms, such as 8×10 bits, 14×18 bits or 24×24 bits, and in order to develop it on the image memory at a predetermined character interval, it is necessary to shift the character pattern data bit by bit in accordance with the address of the image memory.

In order to achieve this, the character pattern data is shifted bit by bit by a register in the CPU and then it is written into the image memory 4 bits parallel or 8 bits parallel, or a high speed shift circuit is provided between the CPU and the image memory and the character pattern data is shifted thereby and then it is written into the image memory. In the former method, the processing speed is too low when a high speed printer such as a laser beam printer is used. In the latter method, when a shift value is different from character pattern to character pattern, the CPU must update the shift value of the high speed shift circuit and the high speed feature of the high speed shift circuit is not fully utilized.

SUMMARY OF THE INVENTION

It is an object of the present invention to remove the drawbacks above-mentioned.

It is another object of the present invention to improve a bit data processor which can shift a bit data.

It is another object of the present invention to provide a bit data processor which can shift a bit data by a desired number of bits with a relatively simple configuration.

It is another object of the present invention to provide a bit data processor which can shift a data bit at a high speed.

It is another object of the present invention to provide a bit data processor which can move image data by a desired distance.

It is another object of the present invention to provide a bit data processor which can shift data with a conventional data input.

Other objects of the present invention will be apparent from the following description and claims.

DETAILED DESCRIPTION OF THE PREFERRED EMBODIMENT

[Data Conversion Circuit (FIGS. 1 and 2)]

Figure 1:
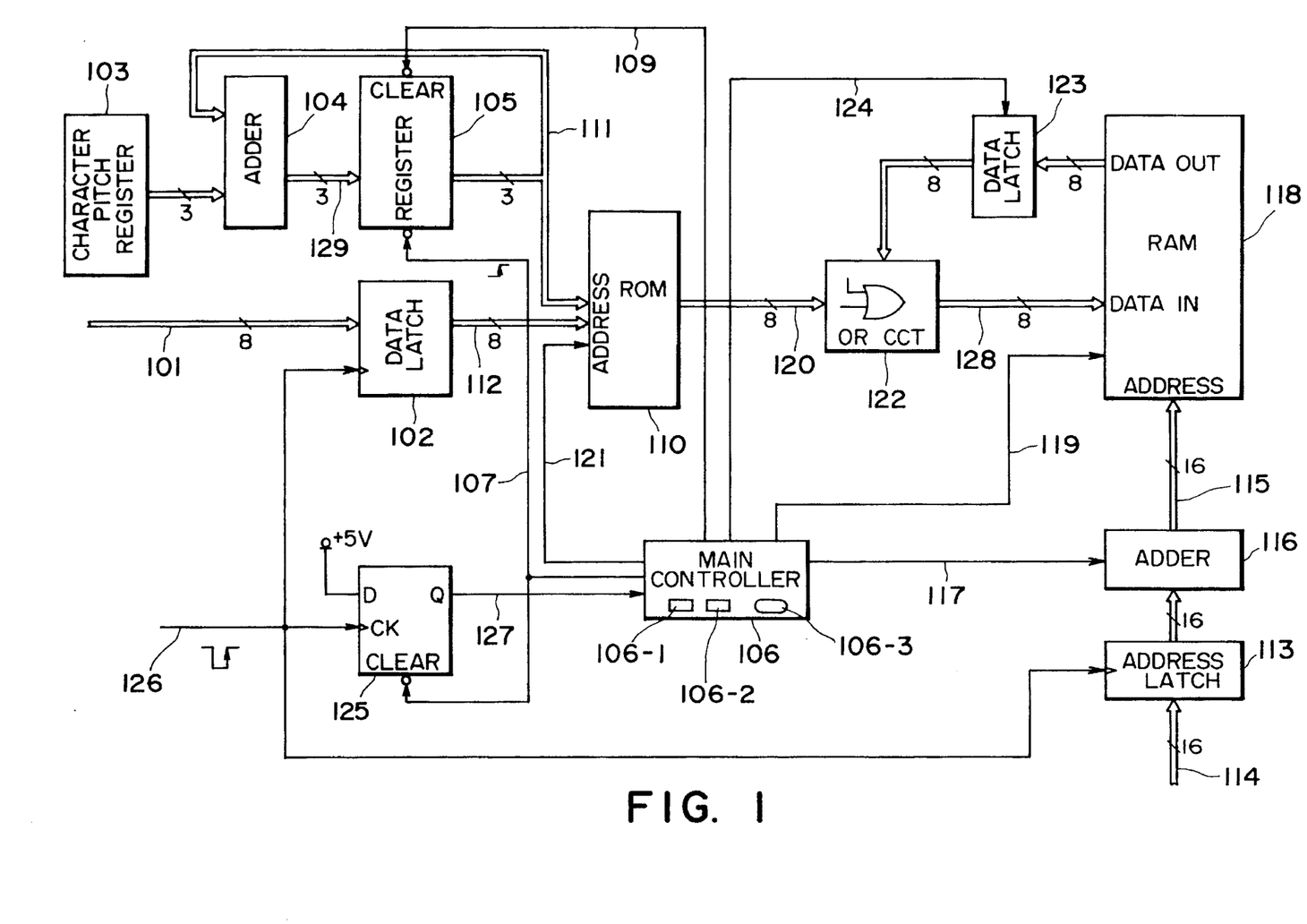
FIG. 1 shows a data conversion circuit in accordance with one embodiment of the present invention.

FIG. 1 shows a data conversion circuit for a character pattern in accordance with one embodiment of the present invention. Arrow lines indicate signals or information and numerals shown near oblique lines on the arrow lines indicate the numbers of bits of the signals or information. The character pattern in the present embodiment includes alphanumeric characters such as "A", "B", "3", "7" as well as graphic patterns.

Numeral 101 denotes a character pattern data (dot data) of 8-bit configuration supplied from a data generation circuit (not shown), numeral 102 denotes a latch circuit for latching the character pattern data 101 by a latch signal 126 and numeral 103 denotes an intercharacter pitch register which stores an intercharacter pitch data. The content of the register 103 determines a shift distance of the character pattern data 101.

Numeral 104 denotes a 3-bit adder which adds the content of the intercharacter pitch register 103 to the content of the register 105. Numeral 105 denotes a register which latches the output of the adder 104 at a rise of a latch signal 107 and cleared by a clear signal 109, and numeral 106 denotes a main control unit which includes a CPU such as a microcomputer, and ROM and RAM (106-1, 106-2, 106-3).

Numeral 110 denotes a bit shift ROM (table) which produces an 8-bit data 120 when addressed by a signal 111 from the register 105, a signal 112 from the data latch 102 and a signal 121 from the main control unit 106. Numeral 113 denotes an address latch which latches an address information 114 supplied from a host computer by a latch signal 126, numeral 116 denotes an adder which adds the output of the address latch 113 to a signal 117 supplied from the main control unit 106, and numeral 118 denotes a bit image RAM which writes an output of an OR circuit 122 into an address designated by the output of the adder 116 by a write signal 119 from the main control unit 106. The RAM 118 may store a bit data of one page of an image to be printed out by a printer (not shown).

Numeral 123 denotes a data latch circuit which latches the output data of the RAM 118 by a latch signal 124 supplied from the main control unit 106, and numeral 125 denotes a D type flip-flop which is set by a latch signal 126 to inform to the main control unit 106 that the data 101 has been latched in the data latch 102.

Figure 2:
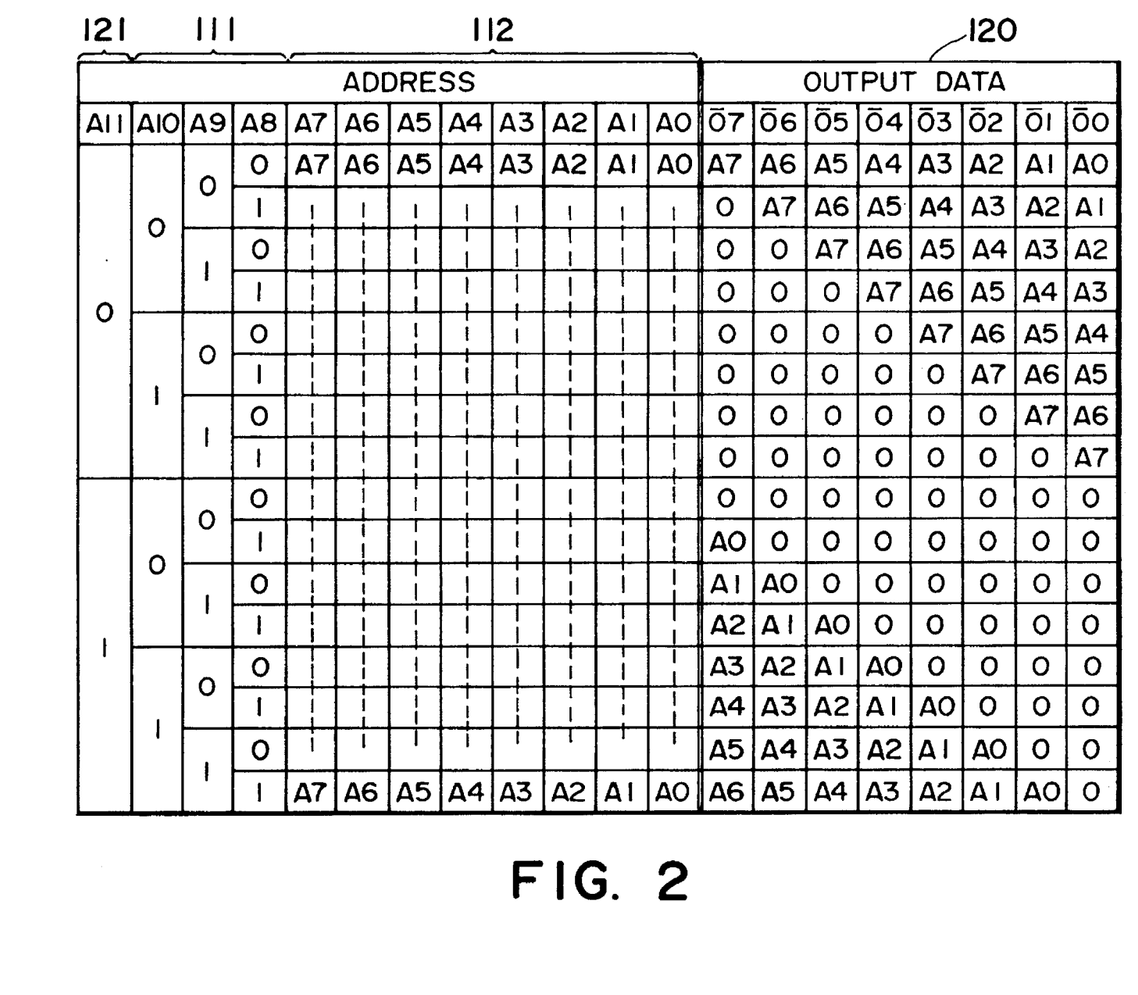
FIG. 2 shows a content of the bit shift ROM.

FIG. 2 shows a content of the bit shift ROM 110. When the ROM 110 is addressed by the 3-bit (A8–A10) signal 111 from the register 105, the signal 121 from the main control unit 106 and the 8-bit (A0–A7) data 112 from the data latch 102, it outputs the bit data 120 shown in FIG. 2.

[Shifting of the Character Pattern (FIGS. 3A–3C)]

Figures 3A, 3B:
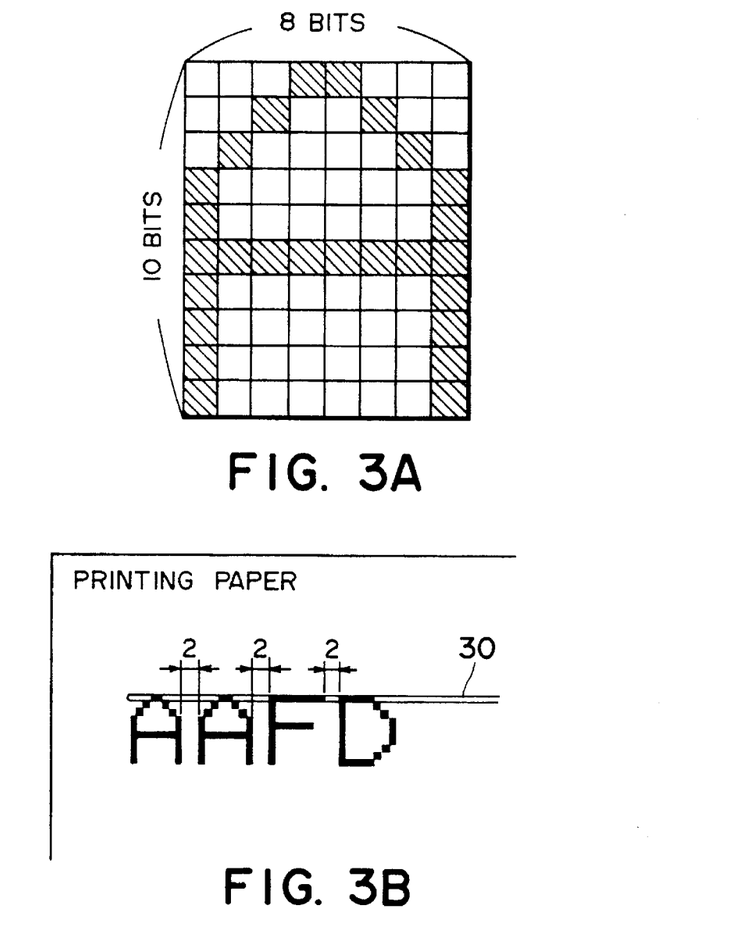
FIG. 3A shows an 8×10 character pattern.
FIG. 3B shows a printout printed at 2-bit interval.
Figure 3C:
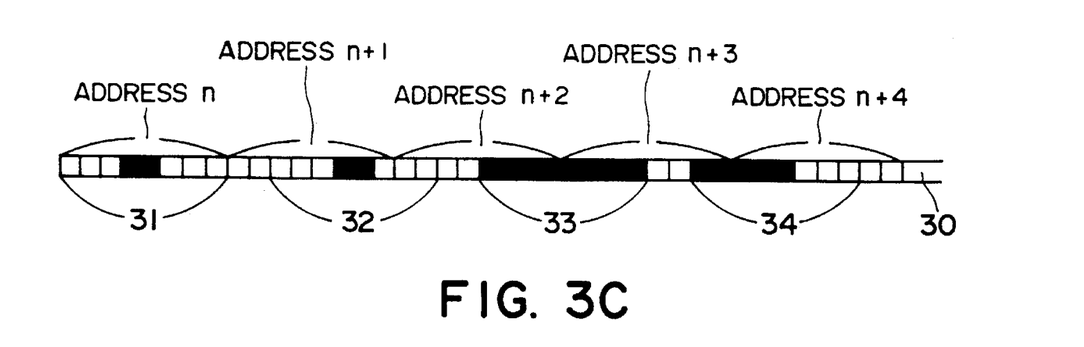
FIG. 3C shows a memory configuration when the printout of FIG. 3B is made.

FIG. 3A shows an 8×10-bit character pattern, FIG. 3B shows printing of the character pattern shown in FIG. 3A on a print sheet by a printer (not shown) at a character pitch of two, and FIG. 3C shows a relationship between the printed data (bit image) of the line 30 shown in FIG. 3B and the address of the RAM 118. Numerals 31 and 32 denote data for the characters "A", numeral 33 denotes data for the character "F" and numeral 34 denotes data for the character "D" on the line 30.

[Circuit Operation (FIGS. 1–4)]

The conversion shown in FIGS. 3B and 3C is explained with reference to FIGS. 1–4.

In this case, it is assumed that 2 (010) has been preset in the intercharacter pitch register 103, the register 105 has been cleared by the clear signal 109 from the main control unit 106 and the RAM 118 has been cleared.

Figure 4:
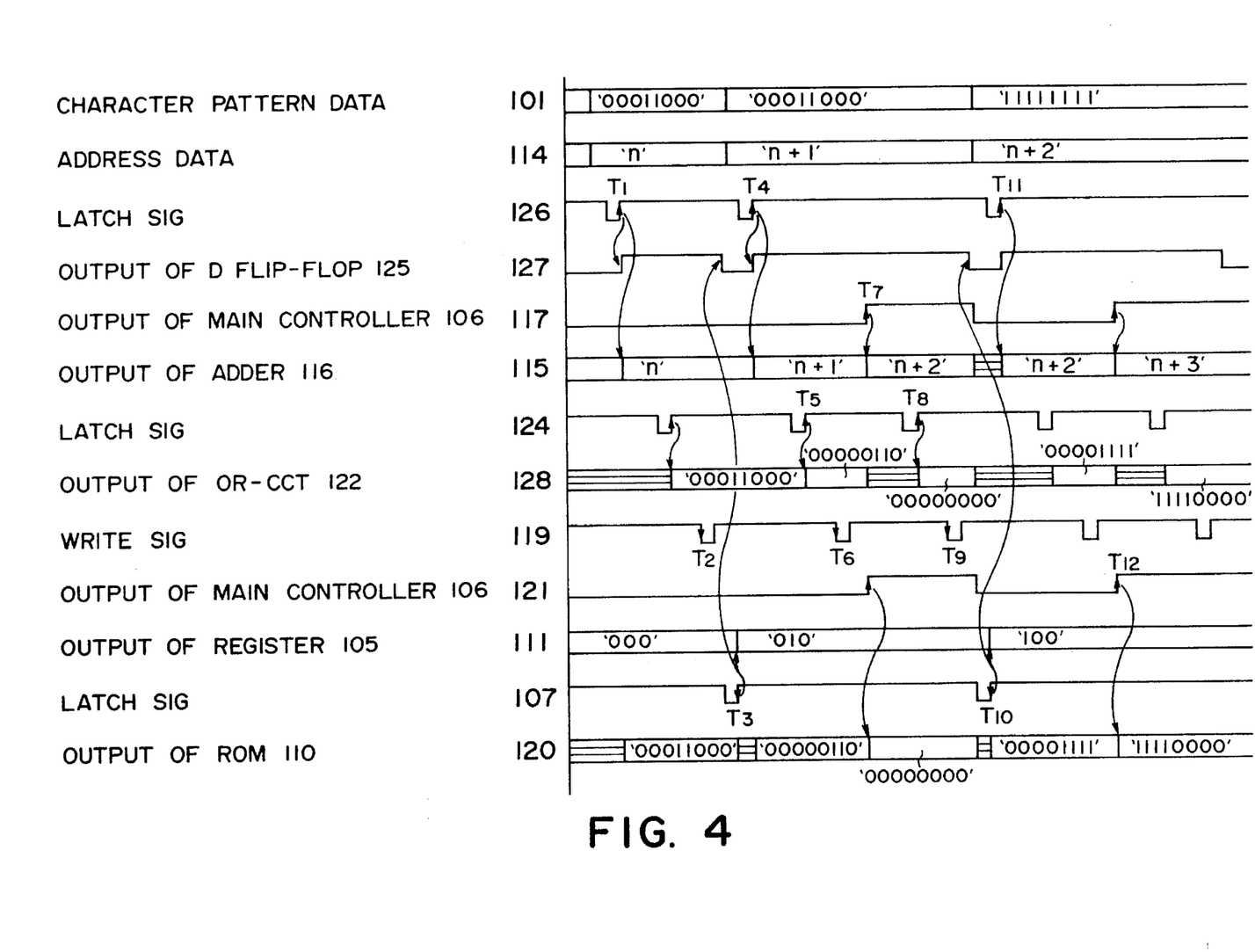
FIG. 4 shows a timing chart for the circuit of FIG. 1.

The 8-bit character pattern data 101 to be written into the RAM 118 and the address data 114 are externally supplied, and when the latch signal 126 which is the write pulse is supplied (at this time, the address data 114 is n and the character pattern data 101) is "00011000" as shown in FIG. 3C), the Q output 127 of the D flip-flop assumes a high level to inform to the main control unit 106 that the data has been received (timing $T_1$ in FIG. 4).

Since the main control unit 106 renders the signals 117 and 121 to a low level and clears the register 105, the output data 111 of the register 105 is "0" and the output data 120 of the bit shift ROM 110 is same as the data 112, that is, "00011000". Since the addresses A8—A11 of the bit shift ROM 110 are "0000", when "00011000" is supplied to the addresses A0–A7, the ROM 110 produces "00011000" (see FIG. 2). This data 120 is written into the address n of the RAM 118 by the write signal 119 at a timing $T_2$ of FIG. 4. Since the signal 117 is now at the low level, the adder 116 supplies the address data "n" 114 as it is to the RAM 118.

Then, the main controller 106 produces the latch signal 107 to latch the output of the adder 104 to the register 105. Thus, the output data 111 (address A8–A10) of the register 105 changes to "010" and the D flip-flop 125 is cleared and the signal 127 assumes the low level (timing $T_3$).

When the address data 114 is "n+1" and character pattern the data 101 representing "A" is "00011000" (timing $T_4$), the signal 121 is at the low level or "0" and the address A0–A11 of the ROM 110 changes to "001000011000", and the output data 120 is "00000110" (see FIG. 2). Since the data at the address n+1 of the RAM is "0", this data is latched into the data latch 123 by the latch signal 124. Thus, the output data 128 of the OR circuit 122 is equal to the output data 120 (timing $T_5$), and "00000110" is written into the address n+1 by the next write signal 119 (timing $T_6$).

When the signals 117 and 121 are at the high level, the address 115 of the RAM 118 is n+2 (timing $T_7$). When the latch signal 124 is produced, the content at the address n+2 of the RAM 118, that is, "0" is latched in the data latch 123. On the other hand, since A11 is "1", A10–A8 are "010" and A7–A0 are "00011000", the address of the ROM 110 is "101000011000" and the output data 120 of the bit shift ROM 110 is "00000000" (timing $T_8$). Thereafter, "0" is written into the address n+2 of the RAM 118 by the write signal 119 (timing $T_9$).

When the main control unit 106 produces the signal 107 to latch the register 105 and clear the D flip-flop 125, the output 111 of the register 105 is "100" (010+010=100) (timing $T_{10}$). The signals 117 and 121 are substantially simultaneously rendered to the low level.

When the address 114 is n+2 and the data 101 which represents the character pattern "F" is supplied as "11111111" (timing $T_{11}$), the address of the ROM 110 is "010011111111" because A11 is "0", A10–A8 are "100" and A7–A0 are "11111111", and "00001111" is written into the address n+2 of the RAM 118. Then, the signals 117 and 121 are rendered to a high level and the address n+3 of the RAM 118 is read into the data latch 123 and the address of the ROM 110 is changed to "110011111111". Thus, the output data 120 is "11110000" and "11110000" is written into the address n+3 of the RAM 118 by the write signal 119 (timing $T_{12}$).

The above operation is repeated. If the character pattern 34 for the character "D" shown in FIGS. 3B and 3C is supplied to the address n+3, the output of the data latch 123 "11110000" and the data 120 "00000011" are logically ORed by the OR circuit 122 and the output thereof is stored at the address n+3 of the RAM 118.

[Operation of Main Control Unit (FIGS. 1 and 5)]

Figure 5:
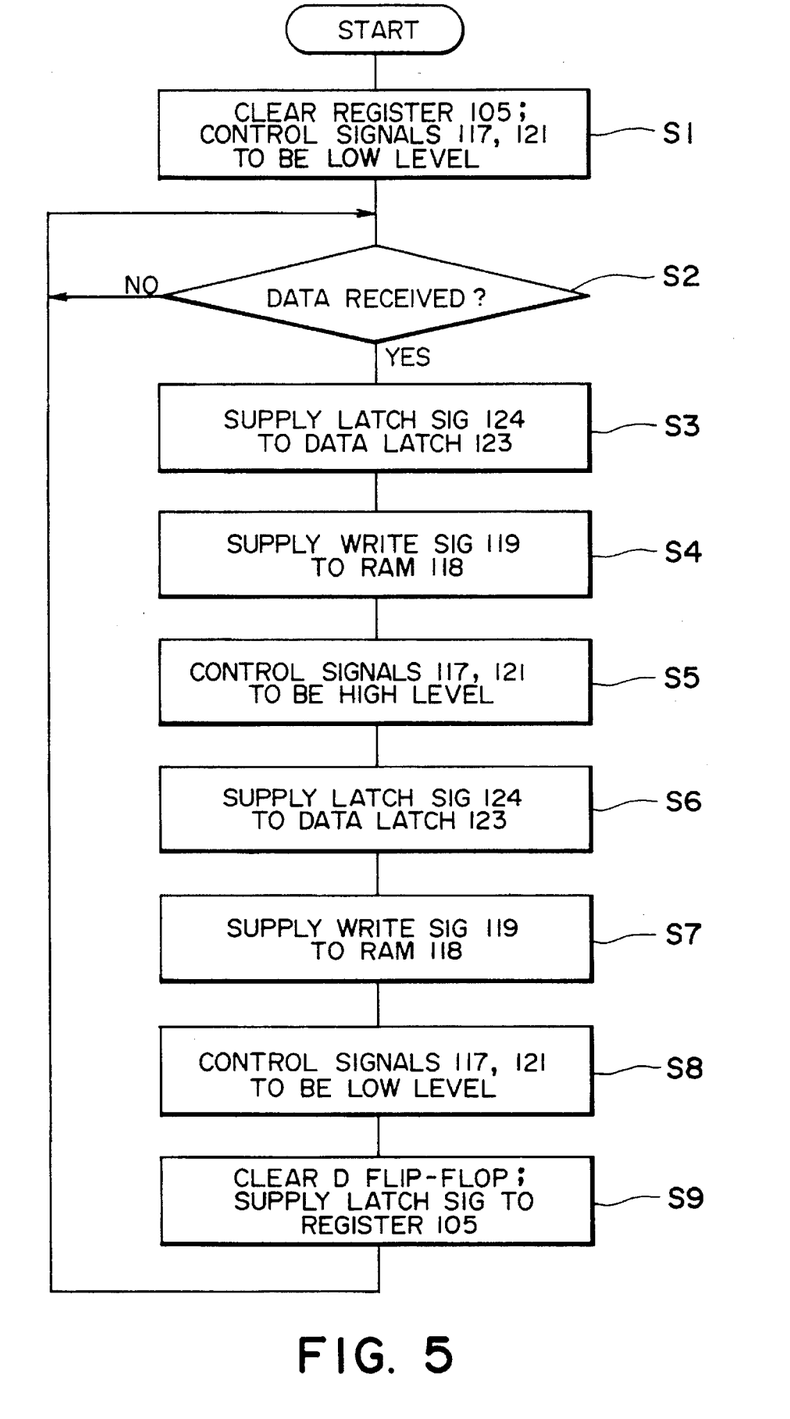
FIG. 5 shows a flow chart of an operation of a main control unit.

FIG. 5 shows a flow chart of a control procedure stored in the ROM 106-2 of the main control unit 106. In the flow chart of FIG. 5, a step to store the first character pattern into the RAM 118 is omitted.

In a step S1, the register 105 is cleared and the signals 117 and 121 are rendered to a low level. In a step S2, the Q output 127 of the D flip-flop 125 is checked to see whether the address data 114 and the data 101 have been externally supplied. If the data have been supplied, the process proceeds to a step S3 and the latch signal 124 is sent to the data latch 123 and the content at the current address 115 is sent to the OR circuit 122.

In a step S4, the write signal 119 is supplied to the RAM 118 to write the data 128 therein. In a step S5, the signals 117 and 121 are rendered high level, the address of the RAM 118 is incremented by one and the output data 120 of the ROM 120 is switched.

In steps S6 and S7, like in the steps S3 and S4, the content of the RAM 118 is latched in the data latch 123 and it is logically ORed with the data 120 by the OR circuit 122 and the output 128 thereof is written into the RAM 118. In a step S8, the signals 121 and 117 are again rendered to a low level. In a step S9, the D flip-flop is cleared and the content of the intercharacter pitch register 103 is added to the register 105.

In the present embodiment, the character pitch is 2 bits, the data 101 is 8-bit data and the address information 116 is 16-bit information, although the pitch data and information may be different in number.

While the main control unit 106 comprises the CPU in the embodiment, it may be hardware. The character pitch which determines the number of shifts may be designated by a digital switch in place of the memory.

Figure 6:
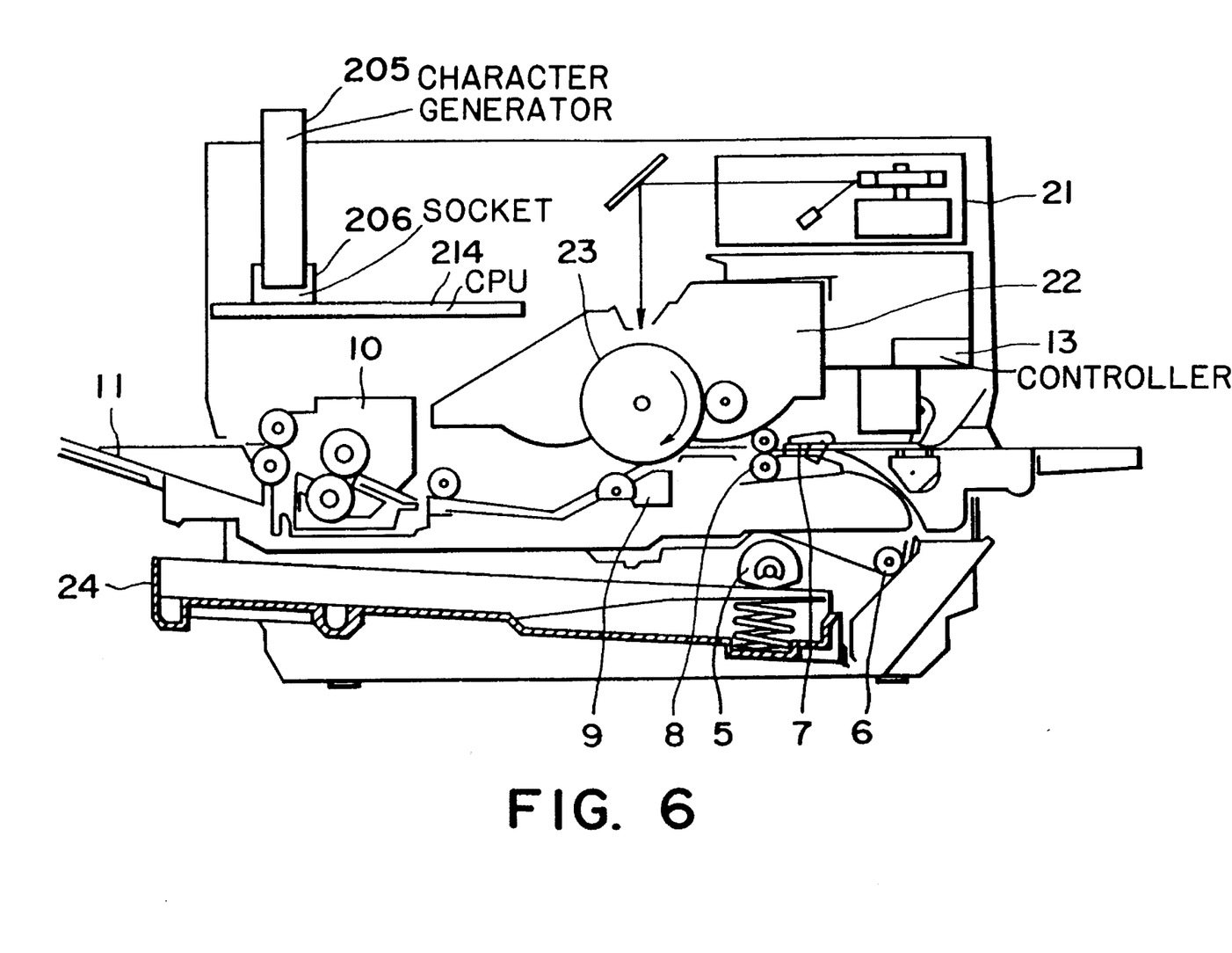
FIG. 6 shows a laser beam printer to which the present invention is applied.

FIG. 6 shows a sectional view of a laser beam printer to which the present invention is applied.

In FIG. 6, numeral 21 denotes an exposure unit having a scanner and a laser, numeral 22 denotes a developing unit for visualizing a latent image formed on a photoconductor drum 23, numeral 24 denotes a paper cassette, numeral 5 denotes a paper feed roller for feeding papers one by one from the paper cassette 24 to a feed roller 6, numeral 7 denotes a regist shutter by which the paper fed by the feed roller 6 is temporarily stopped so that synchronization is maintained between the projection of a laser beam, rotation of the photoconductor drum 23 and the feed of the paper, numeral 8 denotes a feed roller for feeding the paper into a transfer station 9, numeral 10 denotes a fixing unit for fixing a toner image transferred onto the paper, numeral 11 denotes a stacker for receiving ejected papers, numeral 205 denotes a pluggable character generator which generates character patterns in accordance with code signals sent from a host (not shown), numeral 206 denotes a socket, and numeral 214 denotes a CPU board on which the data conversion circuit shown in FIG. 1 is mounted.

In such a laser beam printer, a sequence of operation timings for feeding of paper and development are controlled by the sequence controller 13. The laser beam printer turns on and off the laser beam in accordance with the "1" and "0" video signals from the RAM 118 to form the visual image on the photoconductor drum 23.

The laser beam printer has a known beam detector to detect a beam scan position, and the "1" and "0" pattern data stored in the RAM 118 are read out in synchronism with the detection output of the beam detector.

The content of the intercharacter pitch register 103 may be set in accordance with a command sent from the host (not shown), or it may be automatically calculated based on a size of the sheet which the printer uses and the number of characters in the line.

The present invention is not limited to the illustrated embodiment but various modifications thereof may be made within a scope of the appended claims.

I claim:

1. A character pattern data processor comprising:

input means for inputting pattern data;

selection data generation means for generating shift amount data representative of a lateral shift amount of the input pattern data;

shifted pattern data output means for outputting at least one of first and second shifted pattern data different from each other, in response to the input pattern data and the shift amount data, said shifted pattern data output means comprising a memory for storing a plurality of shifted pattern data, including at least the first and second shifted pattern data, obtained by shifting pattern data by respectively different shift amounts;

memory means;

address designating means for designating an address of said memory means, said address designating means capable of designating a common address for respectively different pattern data; and combination means for combining data previously stored at the address designated by said address designating means with the shifted pattern data output from said shifted pattern data output means, and for writing thus-combined data at the address designated by said address designating means.

2. A character pattern data processor according to claim 1, wherein said memory means has a memory capacity corresponding to one page.

3. A character pattern data processor according to claim 1, further comprising output means for outputting an image on the basis of the data stored in said memory means.

4. A character pattern data processor according to claim 3, wherein said output means prints an image on a recording medium by using an electrostatic recording method.

5. A method of processing character pattern data, comprising the steps of:

(a) receiving pattern data;

(b) generating selection data representative of a lateral shift amount;

(c) outputting shifted pattern data in response to (i) the pattern data and (ii) the selection data, wherein in said step (c), first and second shifted pattern data different from each other can be outputted, said step (c) comprising the steps of reading the pattern data received in said step (a) and reading shifted pattern data specified by the selection data generated in step (b), the shifted pattern data being read from a plurality of shifted pattern data, including at least the first and second shifted pattern data, obtained by shifting pattern data by respectively different shift amounts;

(d) designating an address of memory means; and (e) combining data previously stored at the address designated in said step (d) with the shifted pattern data outputted in said step (c), and writing thus-combined data in the address designated in said step (d).

6. A method according to claim 5, wherein said memory means has a memory capacity corresponding to one page.

7. A method according to claim 5, further comprising the step of outputting an image on the basis of the data stored in said memory means.

8. A method according to claim 7, wherein in said step of outputting, an image is printed on a record medium by using an electrostatic recording method.

9. A character pattern data processor, comprising:

input means for inputting pattern data comprising at least a part of a character pattern;

shift amount generating means for generating shift amount data representative of a lateral shift amount for he input pattern data, said shift amount generating means being incremented for each sequential character pattern in accordance with an amount stored in a pitch register;

shifted pattern output means, responsive to pattern data from said input means and shift amount data from said shift amount generating means, for outputting shifted pattern data in each of first and second timing intervals, wherein in the first timing interval the shifted pattern data includes a beginning portion of the input pattern data shifted by the shift amount data, and wherein in the second timing interval the shifted pattern data includes an ending portion of the input pattern data shifted by the shift amount data;

a memory for storing shifted pattern data output by said output means;

address designating means for designating an address in said memory, wherein in the second timing interval for a first character pattern, said address designating means designates the same address as in the first timing interval for a next sequential character pattern;

combining means for, in the first time interval for a next sequential character pattern, combining shifted pattern data output by said shifted pattern output means with data at the address in said memory designated by said address designating means, and for storing the thus-combined data in said memory at the address designated by said address designating means; and a main controller for outputting signals indicative of the first and second timing interval to said shifted pattern output means and said address designating means.

10. A character pattern data processor according to claim 9, wherein said main controller also outputs a signal to control incrementation of said shift amount generating means.

11. A method according to claim 9, wherein said memory has a memory capacity corresponding to one page.

12. A pattern data processor comprising:

input means for inputting pattern data;

selection data generation means for generating shift amount data representative of a lateral shift amount of the input pattern data;

memory means;

shifted pattern data output means for outputting at least first and second shifted pattern data different from each other, in response to a single pair of the input pattern data and the shift amount data, in a case where the input pattern data is to be stored in said memory means;

address designating means for designating an address of said memory means, said address designating means designating different addresses for respective said first and second shifted pattern data which are outputted in response to the single pair of the input pattern data and the shift amount data; and combination means for combining data previously stored at the address designated by said address designating means with the shifted pattern data output from said shifted pattern data output means, and for writing thus-combined data at the address designated by said address designating means.

13. A pattern data processor according to claim 12, wherein said shifted pattern data output means comprises a memory for storing a plurality of shifted pattern data obtained by shifting pattern data by respectively different shift amounts.

14. A pattern data processor according to claim 12, wherein said memory means has a memory capacity corresponding to one page.

15. A pattern data processor according to claim 12, further comprising output means for outputting an image on the basis of the data stored in said memory means.

16. A pattern data processor according to claim 15, wherein said output means prints an image on a recording medium by using an electrostatic recording method.

* * * * *

UNITED STATES PATENT AND TRADEMARK OFFICE
CERTIFICATE OF CORRECTION

PATENT NO. : 5,579,465

DATED : November 26, 1996

INVENTOR(S): Shigeru Ueda

It is certified that error appears in the above-identified patent and that said Letters Patent is hereby corrected as shown below:

```
        Column 1, line 66, change "a" to --the-- and
change "the" to --a--.

Column 2, line 32, delete "an".

Column 5, line 29, change "a" to --the--.

Column 6, line 33, change "he" to --the--.

Column 7, line 3, change "method" to
--processor--.
```

Signed and Sealed this

Twentieth Day of May, 1997

Attest:

Attesting Officer

BRUCE LEHMAN

Commissioner of Patents and Trademarks